Oct. 6, 1959     A. E. AWOT     2,907,318
HEAT EXCHANGE APPARATUS
Filed July 2. 1956
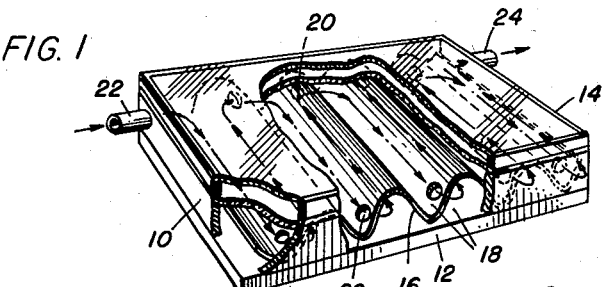
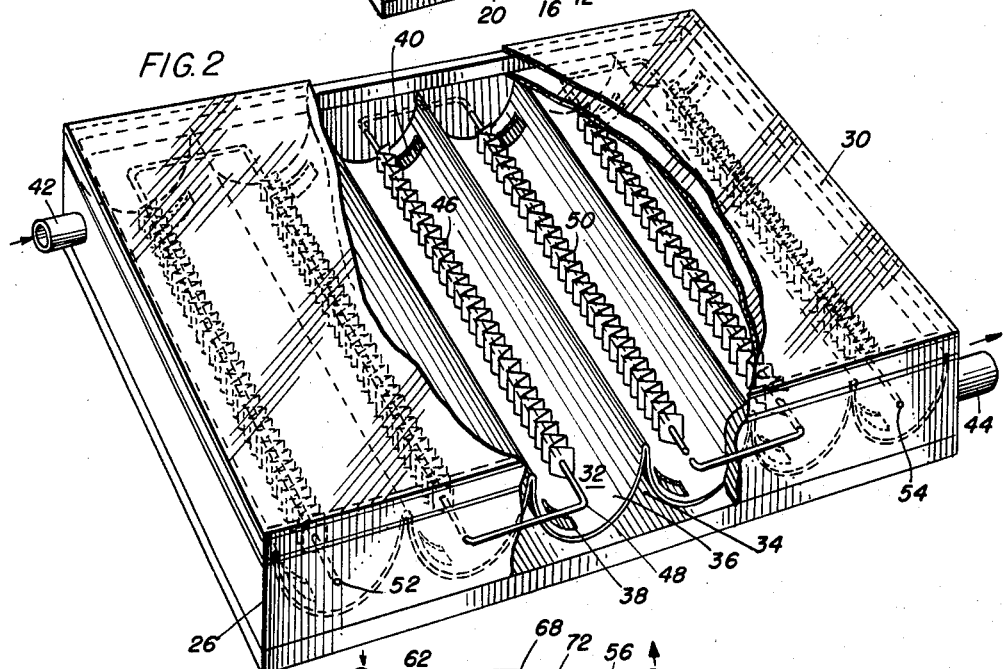
INVENTOR:
ALFRED E. AWOT
BY
ATT'Y

United States Patent Office
2,907,318
Patented Oct. 6, 1959

2,907,318

HEAT EXCHANGE APPARATUS

Alfred E. Awot, Chicago, Ill.

Application July 2, 1956, Serial No. 595,145

5 Claims. (Cl. 126—271)

This invention relates in general to a duct construction in flat or circular form as a collector or jacket for collecting and transporting hot air or hot liquid for any usuable purpose, and the invention is more particularly described as a reflector type of solar heat collector using corrugated sheet ducts and finned tubing located at the focal lines of the reflectors and connected for discharging liquid fluid as well as heated air.

An important object of the invention is to provide a corrugated heat exchange unit adapted to receive and utilize heat which would otherwise be wasted and to discharge it in a usable manner.

A still further object of the invention is to provide a corrugated type of heat exchange apparatus in which reflectors are utilized to concentrate heat at the focal points or lines of the reflectors.

Still a further object of the invention is to provide a corrugated type of reflector enclosed on all sides with the elongated reflector units having openings at opposite ends to form air or fluid passages on opposite sides of the reflectors.

A still further object of the invention is to provide a heat exchange collector having connected reflector ducts with finned tubing located at the focal lines of the reflectors and connected for discharging a highly heated fluid from the tubing.

A still further object of the invention is to provide a solar heat collector unit having corrugated reflector ducts with tubing located at the focal line of each reflector for receiving concentrated heat from the reflector and transporting the liquid therefrom for usable purposes and suitably insulating a unit of such reflectors and tubes.

Other objects of the invention will appear in the specification and will be more apparent from the accompanying drawings in which, Fig. 1 is a perspective view of flat heat collector of the solar type having an enclosed corrugated duct in accordance with this invention;

Fig. 2 is a perspective view of a solar heat collector having corrugated reflectors with finned tubing located along the focal line of each reflector and connected for discharging heated liquid therefrom; and Fig. 3 is a perspective view of a corrugated heat collector unit as applied to the exhaust pipe or jacket of an internal combustion engine for vehicles or the like.

Much usable heat is lost or dissipated which might easily be collected for use in a heat exchange unit using a simple corrugated sheet, preferably of metal which provides parallel ducts and reflectors for transporting the heat in a jacket for engines, and the like, and in a flat unit for a solar heat collector.

The present invention relates particularly to a corrugated duct apparatus in which the ducts are enclosed in a jacket which may be circular or in a flat insulated collector with connections between the ducts at opposite ends thereof to produce a continuous flow of fluid or liquid through the unit.

Referring now more particularly to the drawings, one form of the heat exchange apparatus is shown in Fig. 1 and comprises a receptacle 10 which may be formed of glass or other transparent material having an insulating panel 12 at one side and a hollow glass enclosing panel 14 at the other side. The edges are shown without hollow or insulating panels as a number of units consisting of similar receptacles may be placed together edge to edge if desired.

Within the receptacle thus formed is a corrugated sheet 16 of metal or other suitable material, the opposite projections and ends of which fit tightly within the receptacle 10 forming parallel ducts 18 at each side of the sheet.

In order to form connections between the ducts on opposite sides of the sheet, the sheet is formed with end openings 20 extending through the sheets, each duct having an opening at each end connecting with the duct at the correspondingly opposite side of the sheet to form a continuous passageway in the casing through the ducts from one side of the casing to the other. To complete the unit, the casing is shown with an inlet 22 at one side and an outlet 24 at the other side for the continuous passageway through the casing.

With this arrangement an increased radiating surface is provided in the receptacle for receiving heat rays, the receptacle being insulated at opposite sides by the insulating panel 12 and the hollow glass panel 14.

In Fig. 2, a similar receptacle 26 is shown with an insulating panel at one side and a hollow transparent or glass panel 30 at the other side. A plurality of ducts 32 and 34 are shown at opposite sides of a metal sheet or sheets 36 bent to provide linear parabolic reflectors with end openings 38 and 40 at relatively opposite sides of opposite ends of each reflector, the ducts 32 thus being somewhat parabolic in shape and the corresponding opposite ducts 34 being sharply angular in form. The openings 38 and 40 thus provide a continuous passage through the chamber and through the ducts from an inlet 42 at one side of the receptacle to an outlet 44 at the other side of the reflector communicating with the ducts 34 adjacent thereto and providing a continuous passageway through all of the ducts in succession.

At the focal point of each of the reflector ducts 32 is a heat collector 46 which may be in the form of a wire, a rod or a hollow tube 48 having fins 50 surrounding it throughout its path in the parabolic reflector with the ends of the individual tubes 48 extending outwardly through the receptacle if desired, but preferably having connector portions between adjacent tubes 48 to form a continuous closed path in the receptacle for hot gas or liquid with an inlet 52 at one end and an outlet 54 at the other end so that fluid highly heated by the reflector may be discharged from the heat exchange unit.

This receptacle may also receive heat in any desired manner through the hollow glass insulating panel 30 and it is particularly designed and intended for use as a solar heat connector utilizing the sun's rays in connection with the heating ducts to heat them for the passage of fluid or liquid through the ducts and also to highly heat the hollow tubes at the focal lines of the reflector units so that a highly heated gas or liquid may be discharged therefrom. These fluids and liquids may be collected in any suitable manner outside of the solar heat collector for storing and reusing the heat thus obtained.

A similar arrangement of a circular heat collecting unit is shown in Fig. 3 comprising a jacket for a circular pipe or exhaust manifold. Such a jacket may consist of two semi-circular parts 56, each having an inner wall 58 directly in contact with a muffler or exhaust pipe and an outer insulating cover 60 of suitable insulating material preferably encased in an outer metal wall 62 which adapts two similar sectional parts to be secured together at flanged edges 64 by fastening devices 66.

Between the inner wall and the outer cover is a corrugated sheet 68 having relatively opposite openings 70 and 72 at opposite ends of each duct formed by the corrugations so that the parallel spaces on each side of the corrugations may be connected to form a continuous passageway as previously set forth. This passageway has an inlet 74 at one end and an outlet 26 at the other end so that any heat received by this heat exchange apparatus from a muffler, exhaust pipe or an engine manifold may be collected in the semi-circular collector and transmitted or conveyed for any useful heat preserving use. This construction is similar in construction and operation to the pipes previously described except that the enclosing casing is bent to semi-circular form and the heat is received directly at one side from a heating device instead of indirectly from the sun's rays as in the other two forms.

In all of these constructions, simple types of collectors are provided, each having a corrugated inner member to produce parallel ducts which may be angular, circular or parabolic to accomplish different degrees of heat collection in a similar manner. In heat collectors of this kind, it is a decided advantage to include a heat receiving collector at the focal point of a curved duct where heat radiating from the surface of the duct is concentrated and produces a high resultant heat.

While several different forms and embodiments of the invention have been described in some detail, they should be regarded by way of illustration and example rather than a restriction or limitation thereof, as many changes in the construction, combination and arrangement of the parts may be made without departing from the spirit and scope of the invention.

I claim:

1. In a heat exchange unit, a relatively thin enclosing casing, a sheet with corrugations enclosed in said casing, the opposite projections contacting the upper and lower sides of the casing and the ends of the sheet contacting the ends of the casing to form with the casing parallel ducts on opposite sides of the sheet, each duct having an opening in the sheet at each end respectively connecting it with the adjoining ducts at the opposite sides of the sheet to form a continuous passageway in the casing having portions alternating from one side of the sheet to the other thereof, means to conduct heated fluid from said passageway, the material at the upper side of the casing being transparent to admit heat rays therethrough and the sheet material within the casing comprising concavely curved reflector material for concentrating the heat rays in focal lines lengthwise of the ducts at that side of the casing, and means located at the focal lines of the ducts for receiving the concentration of the heat rays in the ducts and conducting highly heated fluid therefrom to the outside of the casing.

2. In a heat exchange unit in accordance with claim 1, wherein the means disposed at the focal lines of the said ducts comprises tubes connected together and leading to the outside of the casing for transferring heat from said focal heat receiving means to the outside of the casing.

3. In a heat exchange unit in accordance with claim 1, the sheet material forming parabolic reflectors which concentrate the heat waves received thereby in the means located at the focal lines for receiving the heat.

4. In a solar heating unit, a relatively thin casing having heat insulation at one side and a hollow glass cover at the other side, a corrugated metallic sheet in said casing each corrugation of which forms a parabolic reflector exposed at the glass side of the casing, the opposite projections and ends of the sheet secured to the opposite sides and ends of the casing forming parallel ducts at opposite sides of the sheet, each duct having an opening in the sheet at each end respectively connecting it with the adjoining duct at the opposite side of the sheet to form a continuous passageway in the casing through the ducts, an inlet and an outlet for this passageway at opposite sides of the casing for delivering a predetermined quantity of heated fluid, a continuous tubing in the focal line of the parabolic reflectors at the exposed side of the casing to receive heat concentrated therein by the reflectors and the ends of the tubing extending to the outside of the casing for discharging highly heated fluid therefrom.

5. In a solar heating unit in accordance with claim 4, the continuous duct passageway being provided for heating and transferring heated air and fluid from the casing and the tubing being continuous through the parabolic heating ducts, and means to supply air to said passageway and means to supply liquid to said tubing.

References Cited in the file of this patent

UNITED STATES PATENTS

| | | |
|---|---|---|
| 807,642 | Sides et al. | Dec. 19, 1905 |
| 921,976 | Glass | May 18, 1909 |
| 1,014,972 | Nichols | Jan. 16, 1912 |
| 2,553,302 | Cornwall | May 15, 1951 |
| 2,566,327 | Hallock | Sept. 4, 1951 |

FOREIGN PATENTS

| | | |
|---|---|---|
| 484,780 | Canada | July 8, 1952 |